US012612961B1

(12) United States Patent
Meza

(10) Patent No.: US 12,612,961 B1
(45) Date of Patent: Apr. 28, 2026

(54) HATLESS STATOR

(71) Applicant: Schaeffler Technologies AG & Co. KG, Herzogenaurach (DE)

(72) Inventor: Jacob Daniel Meza, Morelos (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/055,532

(22) Filed: Feb. 18, 2025

(51) Int. Cl.
| | |
|---|---|
| *F16H 41/24* | (2006.01) |
| *F16H 41/04* | (2006.01) |
| *F16H 41/26* | (2006.01) |
| *F16H 41/28* | (2006.01) |

(52) U.S. Cl.
CPC ............. *F16H 41/24* (2013.01); *F16H 41/04* (2013.01); *F16H 2041/246* (2013.01); *F16H 41/26* (2013.01); *F16H 2041/285* (2013.01)

(58) Field of Classification Search
CPC .......... F16H 41/04; F16H 41/24; F16H 41/26; F16H 2041/246; F16H 2041/285
See application file for complete search history.

(56) References Cited

U.S. PATENT DOCUMENTS

| | | | | |
|---|---|---|---|---|
| 3,024,735 A | * | 3/1962 | Zeidler | F16H 41/24 |
| | | | | 60/362 |
| 3,287,908 A | * | 11/1966 | Mamo | F16H 41/26 |
| | | | | 60/341 |
| 4,441,315 A | * | 4/1984 | Bochot | F16H 41/24 |
| | | | | 192/3.21 |
| 5,255,516 A | * | 10/1993 | Ejiri | F16H 41/26 |
| | | | | 60/365 |
| 5,836,157 A | * | 11/1998 | Kosuge | F16H 41/26 |
| | | | | 60/362 |
| 5,855,263 A | * | 1/1999 | Fergle | F16D 41/18 |
| | | | | 60/345 |
| 5,966,934 A | | 10/1999 | Kosuge | |
| 9,927,014 B2 | * | 3/2018 | Okaji | F16H 41/24 |
| 10,408,320 B2 | * | 9/2019 | Hess | F16H 45/02 |

OTHER PUBLICATIONS

Horizon Technology, Feb. 25, 2021 (Year: 2021).*

* cited by examiner

*Primary Examiner* — Dustin T Nguyen

(57) ABSTRACT
A stator for a torque converter includes an annular body portion arranged for receiving a one-way clutch outer race and a plurality of blades extending radially outward from the annular body portion. Each of the plurality of blades includes a base portion fixed to the annular body portion, a distal end, radially outside of the base portion, and blade edges extending from the base portion to the distal end. Each of the distal ends is disconnected from the other distal ends in a rotational direction of the stator. A torque converter including an impeller, a turbine and a stator is also disclosed.

13 Claims, 3 Drawing Sheets

HATLESS STATOR

TECHNICAL FIELD

The present disclosure relates generally to a torque converter stator, and more specifically to a hatless stator.

BACKGROUND

Torque converter stators are known. One example is shown and described in U.S. Pat. No. 5,966,934 titled TORQUE CONVERTER FOR MOTOR VEHICLE to Kosuge. Kosuge teaches a stator blade having a radially inner half portion and a radially outer half portion.

SUMMARY

Example aspects broadly comprise a stator for a torque converter including an annular body portion arranged for receiving a one-way clutch outer race and a plurality of blades extending radially outward from the annular body portion. Each of the plurality of blades includes a base portion fixed to the annular body portion, a distal end, radially outside of the base portion, and blade edges extending from the base portion to the distal end. Each of the distal ends is disconnected from the other distal ends in a rotational direction of the stator. In an example embodiment, each of the plurality of blades also includes a transition portion defined by the blade edges and connecting the base portion to the distal end. In an example embodiment, the blade edges are straight. In an example embodiment, the distal end is rotated relative to the base portion. In an example embodiment, a cross-sectional area of the distal end is less than a cross-sectional area of the base portion.

In an example embodiment, the stator also includes a plurality of gaps between respective distal ends. In an example embodiment, the blade edges taper towards one another. In some example embodiments, the stator is manufactured to a final form by compressed powdered metal without additional machining. In an example embodiment, the compressed powdered metal is sintered. In an example embodiment, the stator is devoid of balancing material or balancing cuts. In an example embodiment, the annular body portion comprises a ring-shaped cutout such that a portion of the annular body portion has a c-shape in cross-section.

Other example aspects broadly comprise a torque converter including an impeller arranged for pumping a hydraulic fluid, a turbine arranged for receiving the hydraulic fluid, and the stator. The impeller includes an outer impeller shell, a plurality of impeller blades secured to the outer impeller shell, and an impeller core ring connecting respective distal ends of the impeller blades. The turbine, the turbine includes an outer turbine shell, a plurality of turbine blades secured to the outer turbine shell, and a turbine core ring connecting respective distal ends of the turbine blades. The stator is arranged axially between the impeller blades and the turbine blades, radially inside of the impeller core ring and the turbine core ring. In some example embodiments, the distal ends of the stator blades at least partially overlap radially inner segments of the impeller core ring and the turbine core ring when viewed in a radial direction. In an example embodiment, the stator is devoid of material arranged axially between the radially inner segments of the impeller core ring and the turbine core ring. In an example embodiment, end faces of the radially inner segments of the impeller core ring and the turbine core ring face one another. In an example embodiment, an end face of the radially inner segment of the impeller core ring faces at least partially radially outward, and an end face of the radially inner segment of the turbine core ring faces at least partially radially inward.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
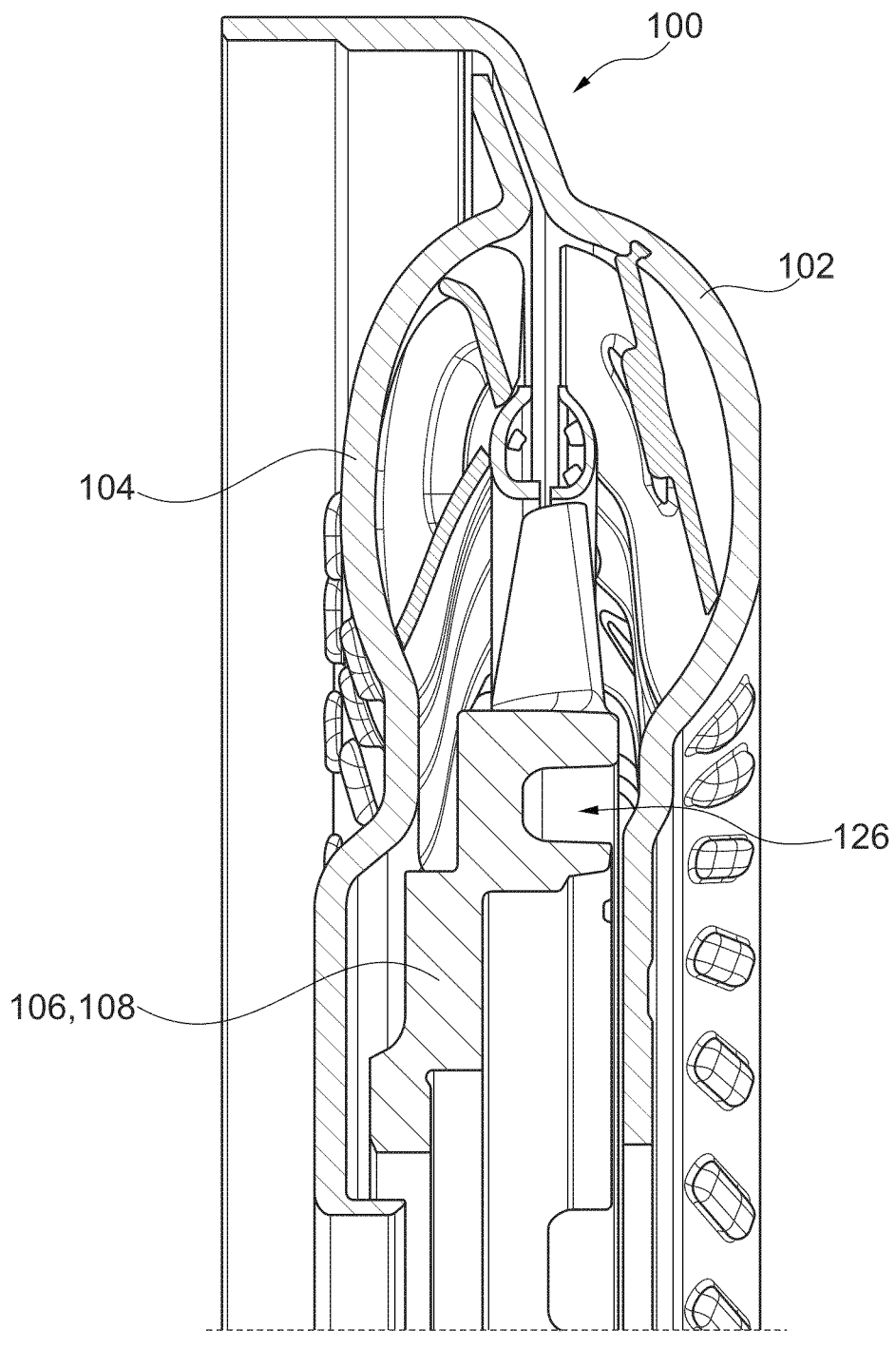
FIG. 1 illustrates a top-half cross-sectional view of a first embodiment of a torque converter according to an example aspect of the disclosure.
Figure 2:
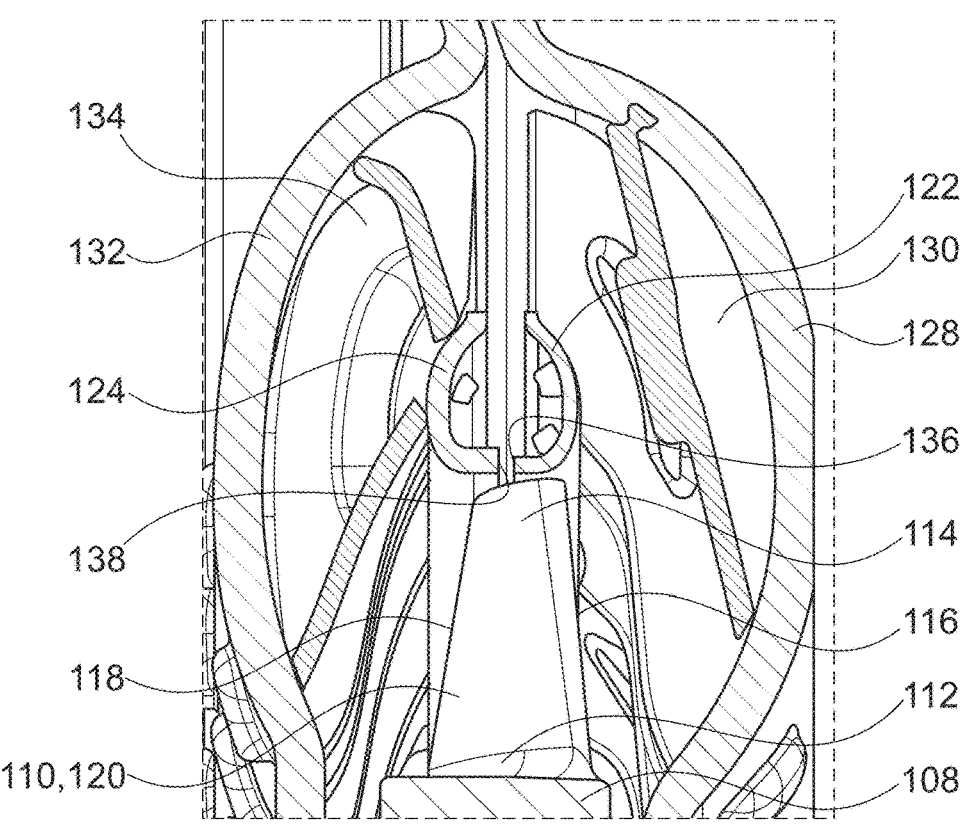
FIG. 2 illustrates a detail view of boxed region 2 in FIG. 1.
Figure 3:
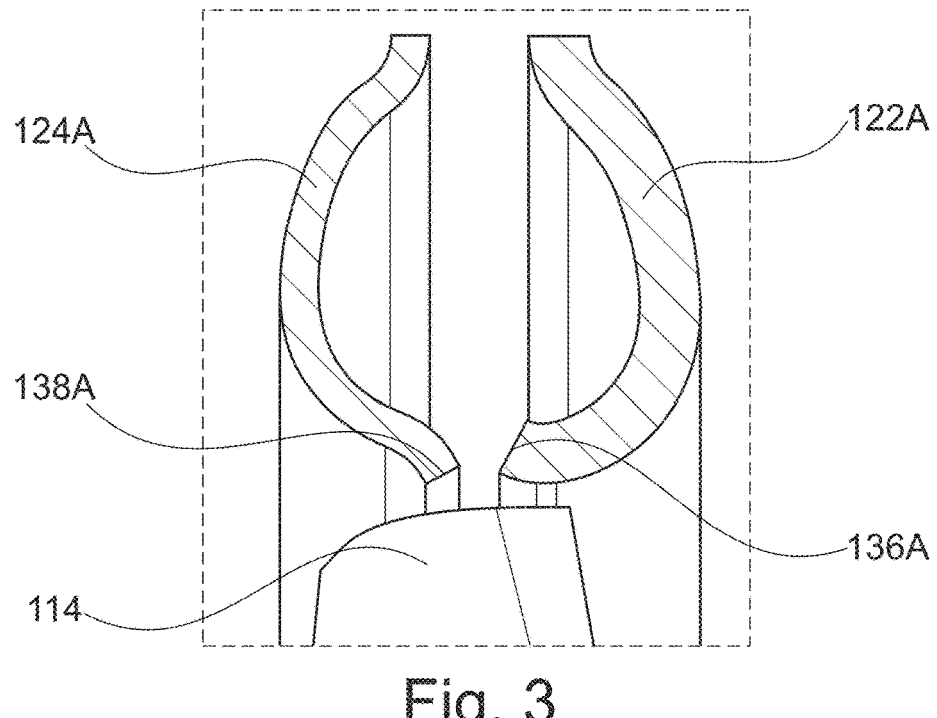
FIG. 3 illustrates a detail view of an alternative embodiment of a portion of the torque converter of FIG. 1.
Figures 4, 5:
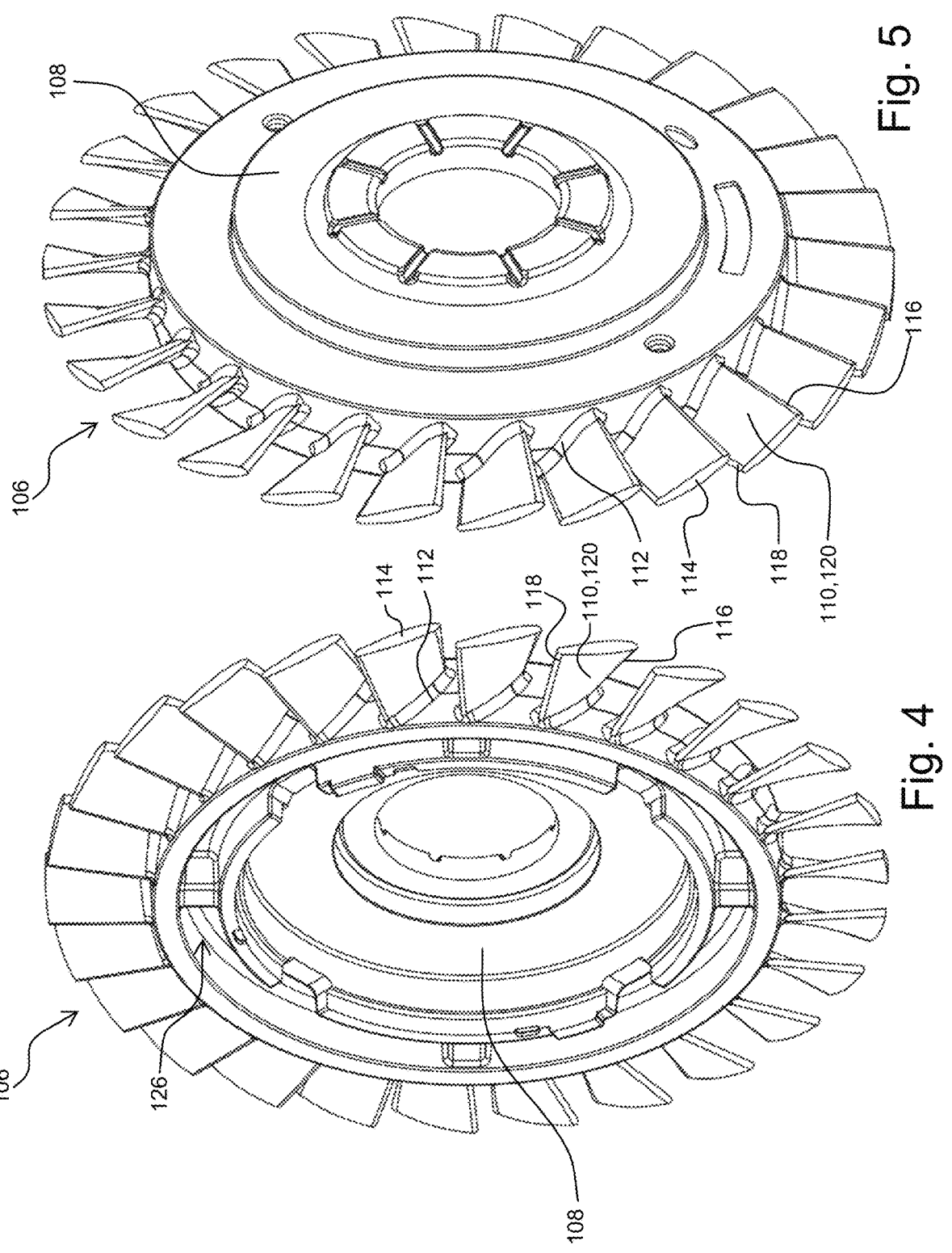
FIG. 4 illustrates a back perspective view of a stator of the torque converter of FIG. 1.
FIG. 5 illustrates a front perspective view of the stator of FIG. 4.

The following description is made with reference to FIGS. 1-3. FIG. 1 illustrates a top-half cross-sectional view of a first embodiment of a torque converter according to an example aspect of the disclosure. FIG. 2 illustrates a detail view of boxed region 2 in FIG. 1. FIG. 3 illustrates a detail view of an alternative embodiment of a portion of the torque converter of FIG. 1. Torque converter 100 includes impeller 102, turbine 104 and stator 106. Stator 106 includes an annular body portion 108 arranged for receiving a one-way clutch outer race (not shown), and blades 110 extending radially outward from the annular body portion. Each blade includes base portion 112 fixed to the annular body portion, and distal end 114, radially outside of the base portion.

The stator also includes blade edges 116 and 118 extending from the base portion to the distal end and tapering towards one another. That is, the base portion has a larger cross-sectional area than that of the distal ends so the blade edges, connecting the base portion to the distal ends, are angled towards one another. Otherwise stated, a cross-sectional area of the distal end is less than a cross-sectional area of the base portion. Blades 110 also include transition portion 120 defined by the blade edges and connecting the base portion to the distal end. As can be seen in the figures, blade edges 116 and 118 are straight. Distal end 114 is rotated relative to base portion 112. In other words, a shape of the cross-section of the distal end is similar to that of the base portion but the distal end shape is rotated relative to the base portion shape when viewed radially.

Stator 106 also includes gaps between respective distal ends and each of the distal ends is disconnected from the other distal ends in a rotational direction of the stator. In other words, each blade extends radially outward and is only connected to the other blades by the body portion. There is no "stator hat" or ring connecting the distal ends of the blades as is common in conventional stator designs. This allows for a longer blade and improved performance because the blade can extend closer to core rings 122 and 124 of the impeller and turbine, respectively.

Stator 106 is manufactured to a final form by compressed powdered metal without additional machining. That is, as opposed to aluminum die casting that is typical for known stator designs, the accuracy of powdered metal forming is sufficient to eliminate further processing such as machining and/or rotationally balancing the stator. That is, the stator is devoid of balancing material or balancing cuts. To further strengthen the stator, the compressed powdered metal is sintered. By sintering, we mean that the part is heated to a temperature below the melting point to bind the particles. To lower mass and material, annular body portion 108 includes ring-shaped cutout 126 such that a portion of the annular body portion has a c-shape in cross-section (ref. FIG. 1).

Impeller 102 is arranged for pumping a hydraulic fluid and turbine 104 is arranged for receiving the hydraulic fluid. Stator 106 redirects the hydraulic fluid into the impeller, providing a torque ratio of the torque converter in a known manner. When a rotational speed of the turbine speed approaches a rotational speed of the impeller, a coupling point is reached and the stator (previously stationary) begins to rotate due to operation of a one-way clutch (not shown).

Impeller 102 includes outer impeller shell 128, impeller blades 130 secured to the outer impeller shell (e.g., by brazing), and impeller core ring 122 connecting respective distal ends of the impeller blades. Turbine 104 includes outer turbine shell 132, turbine blades 134 secured to the outer turbine shell (e.g., by bent tabs and/or brazing), and turbine core ring 138 connecting respective distal ends of the turbine blades. Stator 106 is arranged axially between the impeller blades and the turbine blades, and radially inside of the impeller core ring and the turbine core ring. Distal ends 114 of the stator blades at least partially overlap radially inner segments of the impeller core ring and the turbine core ring when viewed in a radial direction.

Stator 106 is devoid of material arranged axially between the radially inner segments of the impeller core ring and the turbine core ring. That is, typical cast aluminum stators (discussed above) normally include a stator "hat" formed as a ring connecting distal ends of the stator blades and often extending between the core rings providing strength to the ends of the stator blades and additional material for balancing the stator. Here, because due to the additional strength of the powdered forming process, a stator hat is not required allowing extra length of the stator blades to help redirect the hydraulic fluid and improving performance, as discussed above.

As shown in FIGS. 1 and 2, for example, end faces 136 and 138 of the radially inner segments of the impeller core ring and the turbine core ring, respectively, face one another. That is, the end faces are directed predominately axially towards one another. In another embodiment shown in FIG. 3, for example, end face 136A of the radially inner segment of impeller core ring 122A faces at least partially radially outward and end face 138A of the radially inner segment of turbine core ring 124A faces at least partially radially inward. In other words, although the end faces face partially towards one another, they are skewed radially inwards or outwards to adjust a flow of the hydraulic fluid within a torus formed by the impeller, turbine and stator.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Torque converter
102 Impeller
104 Turbine
106 Stator
108 Annular body portion (stator)
110 Blades (stator)
112 Base portion (blades)
114 Distal end (blades)
116 Blade edge
118 Blade edge
120 Transition portion (blades)
122 Core ring (impeller)
122A Core ring (impeller)
124 Core ring (turbine)
124A Core ring (turbine)
126 Ring-shaped cutout
128 Outer impeller shell
130 Impeller blades
132 Outer turbine shell
134 Turbine blades
136 End face (impeller core ring)
136A End face (impeller core ring)

138 End face (turbine core ring)
138A End face (turbine core ring)

What is claimed is:

1. A torque converter, comprising:
an impeller arranged for pumping a hydraulic fluid, the
impeller comprising:
an outer impeller shell;
a plurality of impeller blades secured to the outer
impeller shell; and
an impeller core ring connecting respective distal ends
of the impeller blades;
a turbine arranged for receiving the hydraulic fluid, the
turbine comprising:
an outer turbine shell;
a plurality of turbine blades secured to the outer turbine
shell; and
a turbine core ring connecting respective distal ends of
the turbine blades; and
a stator arranged axially between the impeller blades and
the turbine blades, radially inside of the impeller core
ring and the turbine core ring, the stator comprising:
an annular body portion arranged for receiving a one-
way clutch outer race; and
a plurality of stator blades extending radially outward
from the annular body portion, each of the plurality
of stator blades comprising:
a base portion fixed to the annular body portion;
a distal end, radially outside of the base portion, each
of the distal ends being disconnected from the
other distal ends in a rotational direction of the
stator; and
blade edges extending from the base portion to the
distal end, wherein:
the distal end of each of the plurality of stator blades at
least partially overlaps radially inner segments of the
impeller core ring and the turbine core ring when
viewed in a radial direction;

an end face of the radially inner segment of the impeller
core ring faces at least partially radially outward; and
an end face of the radially inner segment of the turbine
core ring faces at least partially radially inward.

2. The torque converter of claim 1, wherein each of the
plurality of stator blades further comprises a transition
portion defined by the blade edges and connecting the base
portion to the distal end.

3. The torque converter of claim 1, wherein the blade
edges are straight.

4. The torque converter of claim 1, wherein the distal end
is rotated relative to the base portion.

5. The torque converter of claim 1, wherein a cross-
sectional area of the distal end is less than a cross-sectional
area of the base portion.

6. The torque converter of claim 1, further comprising a
plurality of gaps between respective distal ends.

7. The torque converter of claim 1, wherein the blade
edges taper towards one another.

8. The torque converter of claim 1, wherein the stator is
manufactured to a final form by compressed powdered metal
without additional machining.

9. The torque converter of claim 8, wherein the com-
pressed powdered metal is sintered.

10. The torque converter of claim 1 wherein the stator is
devoid of balancing material or balancing cuts.

11. The torque converter of claim 1 wherein the annular
body portion comprises a ring-shaped cutout such that a
portion of the annular body portion has a c-shape in cross-
section.

12. The torque converter of claim 1, wherein the stator is
devoid of material arranged axially between the radially
inner segments of the impeller core ring and the turbine core
ring.

13. The torque converter of claim 1, wherein end faces of
the radially inner segments of the impeller core ring and the
turbine core ring face one another.

* * * * *